United States Patent
Uhm et al.

(10) Patent No.: US 9,297,535 B2
(45) Date of Patent: Mar. 29, 2016

(54) FUEL/AIR MIXING SYSTEM FOR FUEL NOZZLE

(71) Applicant: General Electric Company, Schenectady, NY (US)

(72) Inventors: Jong Ho Uhm, Simpsonville, SC (US); Bryan Wesley Romig, Simpsonville, SC (US); Yon Han Chong, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 526 days.

(21) Appl. No.: 13/776,620

(22) Filed: Feb. 25, 2013

(65) Prior Publication Data

US 2014/0238036 A1   Aug. 28, 2014

(51) Int. Cl.
*F23R 3/28* (2006.01)
*F23R 3/14* (2006.01)

(52) U.S. Cl.
CPC . *F23R 3/286* (2013.01); *F23R 3/14* (2013.01); *F23C 2900/07001* (2013.01); *F23D 2900/14021* (2013.01)

(58) Field of Classification Search
CPC .............. F23R 3/10; F23R 3/12; F23R 3/14; F23R 3/286; F23D 2900/14021; F23C 7/004
See application file for complete search history.

(56) References Cited

U.S. PATENT DOCUMENTS

| | | | | |
|---|---|---|---|---|
| 4,854,127 A * | 8/1989 | Vinson | F23C 7/002 | 239/424.5 |
| 5,251,447 A * | 10/1993 | Joshi | F23R 3/14 | 239/403 |
| 5,284,438 A * | 2/1994 | McGill | F23C 9/006 | 431/116 |
| 5,351,477 A * | 10/1994 | Joshi | F23C 7/004 | 239/400 |
| 5,613,363 A * | 3/1997 | Joshi | F23C 7/004 | 239/403 |
| 5,675,971 A * | 10/1997 | Angel | F23R 3/286 | 239/405 |
| 6,438,961 B2 * | 8/2002 | Tuthill | F23C 7/004 | 60/737 |
| 8,281,596 B1 * | 10/2012 | Rohrssen | F23R 3/002 | 60/737 |
| 8,789,373 B2 * | 7/2014 | Huth | F23R 3/286 | 60/748 |
| 8,966,907 B2 * | 3/2015 | Khan | F23R 3/286 | 60/737 |
| 2005/0268618 A1 * | 12/2005 | Johnson | F23R 3/286 | 60/776 |
| 2006/0080966 A1 * | 4/2006 | Widener | F02C 3/20 | 60/775 |
| 2006/0191268 A1 * | 8/2006 | Widener | F23D 14/78 | 60/772 |
| 2008/0078183 A1 * | 4/2008 | Ziminsky | F23R 3/36 | 60/776 |
| 2009/0056336 A1 * | 3/2009 | Chila | F23R 3/286 | 60/737 |
| 2011/0005189 A1 * | 1/2011 | Uhm | F23D 14/82 | 60/39.281 |
| 2011/0162371 A1 | 7/2011 | Khan et al. | | |
| 2011/0252803 A1 | 10/2011 | Subramanian et al. | | |

(Continued)

OTHER PUBLICATIONS

U.S. Appl. No. 13/405,550, filed Feb. 27, 2012, Jong Ho Uhm.

*Primary Examiner* — Phutthiwat Wongwian
*Assistant Examiner* — Rene Ford
(74) *Attorney, Agent, or Firm* — Fletcher Yoder, P.C.

(57) ABSTRACT

A fuel nozzle includes an inner wall defining a central passage extending in an axial direction of the fuel nozzle, a hub wall surrounding the inner wall and defining a first annular passage, an outer wall surrounding the hub wall and defining a second annular passage, and a shroud surrounding the outer wall and defining a third annular passage. A swirler may receive air and direct the air into the first annular passage. The swirler includes at least one swirl vane extending from the shroud to the hub wall that has an air passage extending between the shroud and the hub wall. The air passage is coupled to the first annular passage and has a first width adjacent the shroud and a second width adjacent the hub wall. The second width is larger than the first width defining a diverging outlet into the first annular passage.

15 Claims, 4 Drawing Sheets

(56) References Cited

U.S. PATENT DOCUMENTS

| | | | | |
|---|---|---|---|---|
| 2012/0073302 A1* | 3/2012 | Myers | ............... | F23D 11/402 60/748 |
| 2012/0174590 A1* | 7/2012 | Krull | ............... | F23N 5/082 60/772 |
| 2012/0308947 A1* | 12/2012 | Melton | ............... | F23R 3/002 431/351 |
| 2013/0125553 A1* | 5/2013 | Bailey | ............... | F23R 3/14 60/772 |
| 2014/0116066 A1* | 5/2014 | Melton | ............... | F23R 3/28 60/806 |
| 2014/0182302 A1* | 7/2014 | Antoniono | ............... | F23R 3/10 60/783 |
| 2014/0238025 A1* | 8/2014 | Uhm | ............... | F23R 3/14 60/737 |

\* cited by examiner

FUEL/AIR MIXING SYSTEM FOR FUEL NOZZLE

BACKGROUND OF THE INVENTION

The subject matter disclosed herein relates to fuel nozzles, and more specifically, to systems to increase fuel/air mixing within the fuel nozzles.

A gas turbine engine combusts a mixture of fuel and air to generate hot combustion gases, which may be used to rotate a load, such as an electrical generator. The gas turbine engine may include one or more fuel nozzles to direct the mixture of fuel and air into a combustion region of the gas turbine. In addition, the one or more fuel nozzles may be used to premix the fuel and the air. Unfortunately, poor mixing of the fuel and the air may reduce the flame stability within the combustion region. In addition, non-uniform mixtures of fuel and air may increase the amount of undesirable combustion byproducts, such as nitrogen oxides.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel nozzle. The fuel nozzle includes an inner wall defining a central passage extending in an axial direction of the fuel nozzle, a hub wall surrounding the inner wall and defining a first annular passage, an outer wall surrounding the hub wall and defining a second annular passage, and a shroud surrounding the outer wall and defining a third annular passage. A swirler may receive air and direct the air into the first annular passage, wherein the swirler includes at least one swirl vane extending from the shroud to the hub wall. The at least one swirl vane has an air passage extending between the shroud and the hub wall, and the air passage is coupled to the first annular passage and has a first width adjacent the shroud and a second width adjacent the hub wall, and the second width is larger than the first width defining a diverging outlet into the first annular passage.

In a second embodiment, a system includes a vane curtain air swirler that may be disposed within a turbine fuel nozzle. The vane curtain air swirler includes one or more swirl vanes. Each swirl vane has a fuel plenum and a radial air passage that increases in width from an inlet to an outlet of the one or more swirl vanes.

In a third embodiment, a method includes directing a first portion of air through a first annular passage between a shroud wall and an outer wall of a fuel nozzle. The method also includes directing a second portion of air through a radial air passage of a swirler into a second annular passage between a hub wall and an inner wall of the fuel nozzle. The hub wall surrounds the inner wall, the outer wall surrounds the hub wall, and the shroud wall surrounds the outer wall. The radial air passage has a diverging outlet into the second annular passage.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward systems for improving fuel and air mixing within fuel nozzles. In particular, the fuel nozzle may include a swirler to deliver air into an axial air passage defined by a hub wall of the fuel nozzle. The air flows downstream into one or more premixing tubes (e.g., a group of 2 to 100 premixing tubes), where the air mixes with fuel and is subsequently directed into a combustion region. The swirler imparts a swirl (e.g., circumferential velocity) to the air. It is beneficial to control the amount of swirl to avoid non-uniform mixing of the air and fuel within the premixing tubes. Poor mixing of the air and fuel may reduce the flame stability in the combustion region, may increase the formation of undesirable combustion byproducts, such as nitrogen oxides, and may also increase the possibility of combustion dynamics excitation. Decreasing the swirl of the air as it flows within the axial air passage may provide a generally uniform distribution of the air into the premixing tubes. To this end, the swirler includes swirl vanes equipped with an inner wall defining a radial air passage. The radial air passage has a diverging outlet into the axial air passage to ensure a generally uniform fuel/air profile in each premixing tube. In particular, the width of the radial air passage increases as it approaches the axial air passage. The diverging outlet reduces the swirl of air into the premixing tubes, thereby increasing the mixing of fuel and air, increasing flame stability within the combustion region, and reducing the amount of undesirable combustion byproducts.

Figure 1:
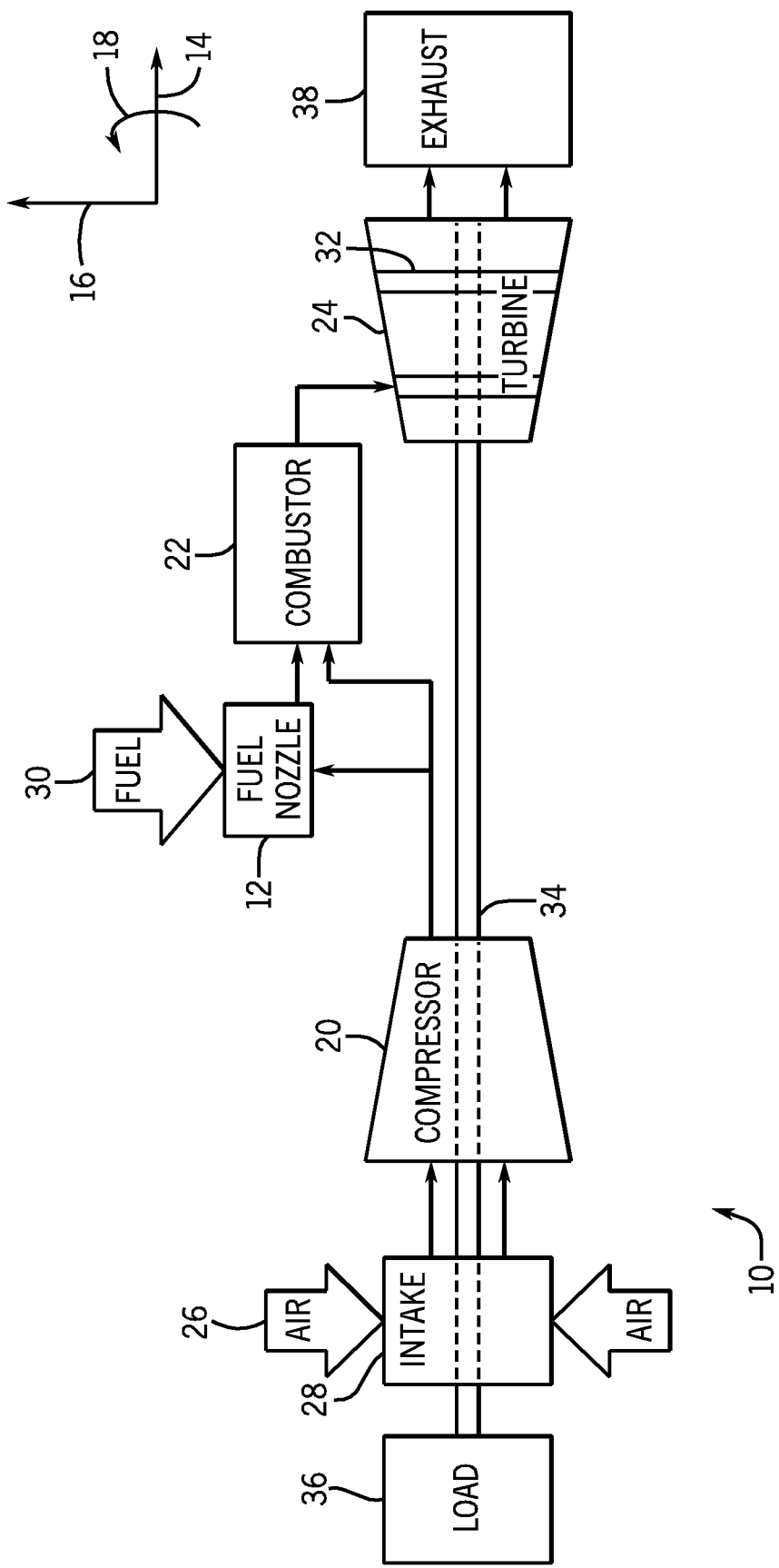
FIG. 1 is a schematic diagram of an embodiment of a gas turbine system having a fuel nozzle with features to improve the mixing of fuel and air.

Turning now to the figures, FIG. 1 illustrates a block diagram of an embodiment of a gas turbine system 10 with a fuel nozzle 12 (e.g., turbine fuel nozzle) to increase mixing of fuel and air. Throughout the discussion, a set of axes will be referenced. These axes are based on a cylindrical coordinate system and point in an axial direction 14, a radial direction 16, and a circumferential direction 18. For example, the axial direction 14 extends along a length or longitudinal axis 17 (shown in FIG. 3) of the fuel nozzle 12, the radial direction 16 extends away from the longitudinal axis 17 (shown in FIG. 3), and the circumferential direction 18 extends around the longitudinal axis 17 (shown in FIG. 3).

As illustrated, the gas turbine system 10 includes a compressor 20, a combustor 22 (e.g., turbine combustor), and a turbine 24. The turbine system 10 may include one or more of the fuel nozzles 12 described below in one or more combustors 22. The compressor 20 receives air 26 from an intake 28 and compresses the air 26 for delivery to the combustor 22. As shown, a portion of the air 26 is routed to the fuel nozzle 12, where the air 26 may premix with fuel 30 before entering the combustor 22. The air 26 and the fuel 30 are fed to the combustor 22 in a specified ratio suitable for combustion, emissions, fuel consumption, power output, and the like. Unfortunately, if the air 26 and the fuel 30 are not well mixed, the flame stability within the combustor 22 may be reduced. Accordingly, the fuel nozzle 12 includes a swirler with swirl vanes having diverging outlets to improve the mixing and uniformity of fuel and air, as will be discussed further below.

After the mixture of the air 26 and the fuel 30 is combusted, the hot combustion products enter the turbine 24. The hot combustion products force blades 32 of the turbine 24 to rotate, thereby driving a shaft 34 of the gas turbine system 10 into rotation. The rotating shaft 34 provides the energy for the compressor 20 to compress the air 26. For example, in certain embodiments, compressor blades are included as components of the compressor 20. Blades within the compressor 20 may be coupled to the shaft 34, and will rotate as the shaft 34 is driven to rotate by the turbine 24. In addition, the rotating shaft 34 may rotate a load 36, such as an electrical generator or any device capable of utilizing the mechanical energy of the shaft 34. After the turbine 24 extracts useful work from the combustion products, the combustion products are discharged to an exhaust 38.

Figure 2:
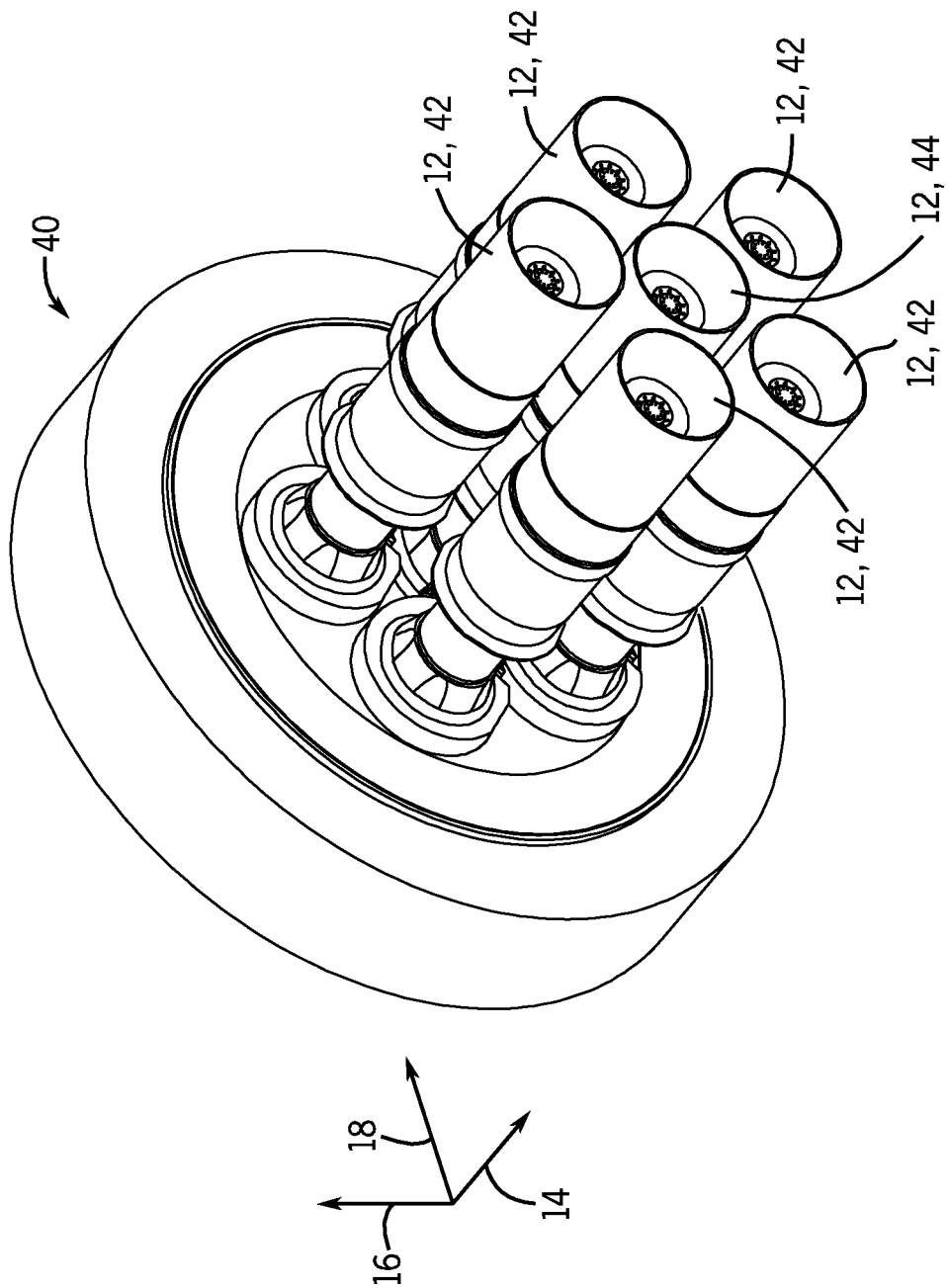
FIG. 2 is a perspective view of an embodiment of the fuel nozzles of FIG. 1, illustrating the arrangement of the fuel nozzles within a combustor of the gas turbine system.

As noted previously, the gas turbine system 10 includes one or more fuel nozzles 12 with features to improve the mixing and uniformity of the air 26 and the fuel 30. FIG. 2 illustrates an arrangement of the fuel nozzles 12 within the combustor 22 of the gas turbine system 10. As shown, six fuel nozzles 12 are mounted to a head end 40 of the combustor 22. However, the number of fuel nozzles 12 may vary. For example, the gas turbine system 10 may include 1, 2, 3, 4, 5, 10, 50, 100, or more fuel nozzles 12. The six fuel nozzles 12 are disposed in a concentric arrangement. That is, five fuel nozzles 12 (e.g., outer fuel nozzles 42) are disposed about a central fuel nozzle 44. As will be appreciated, the arrangement of the fuel nozzles 12 on the head end 40 may vary. For example, the fuel nozzles 12 may be disposed in a circular arrangement, in a linear arrangement, or in any other suitable arrangement. The flow of the air 26 and the fuel 30 within the fuel nozzles 12 is discussed below with respect to FIGS. 3-4.

Figure 3:
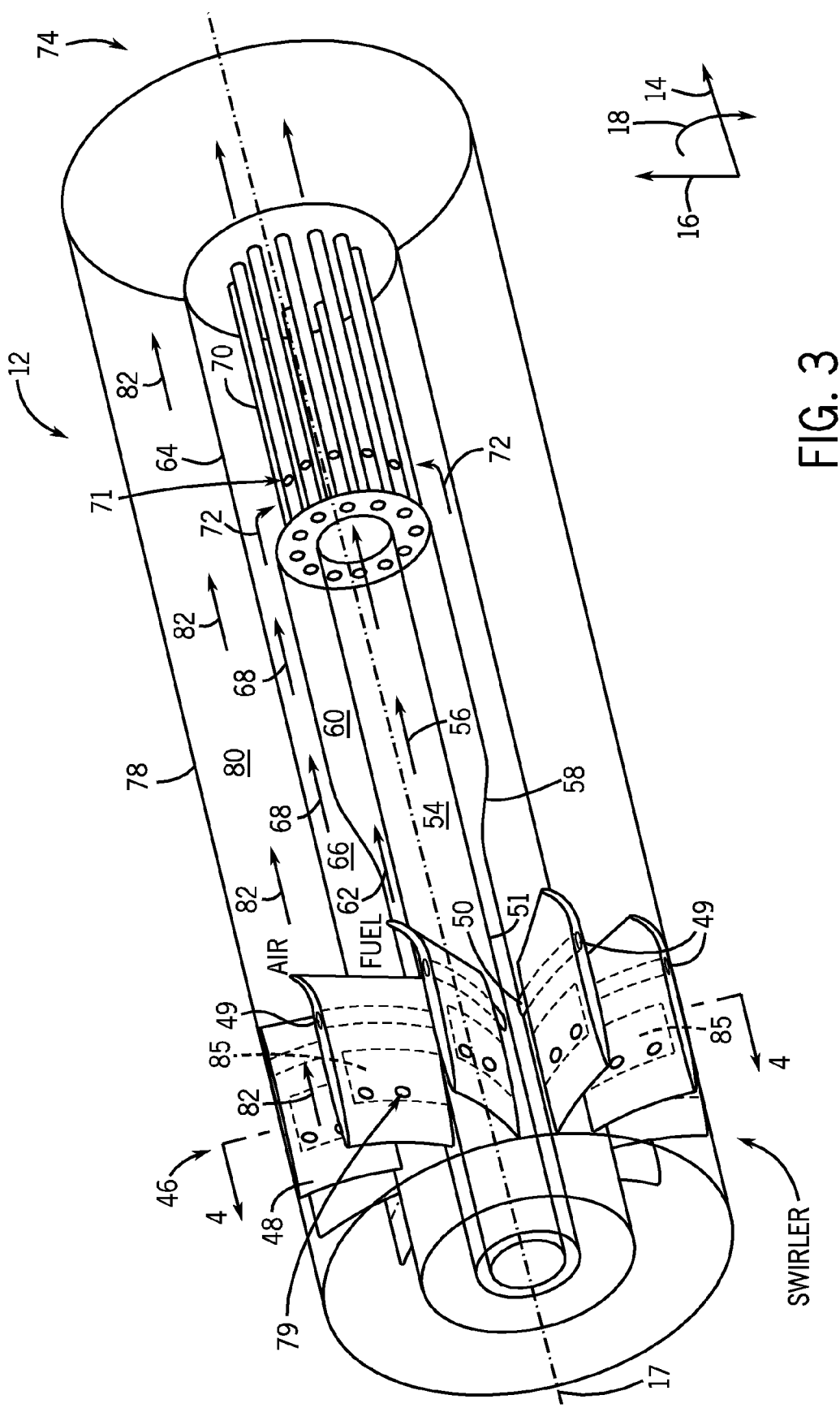
FIG. 3 is a cross-sectional view of an embodiment of one of the fuel nozzles of FIG. 2, illustrating a swirl vane with features to improve fuel/air mixing.
Figure 4:
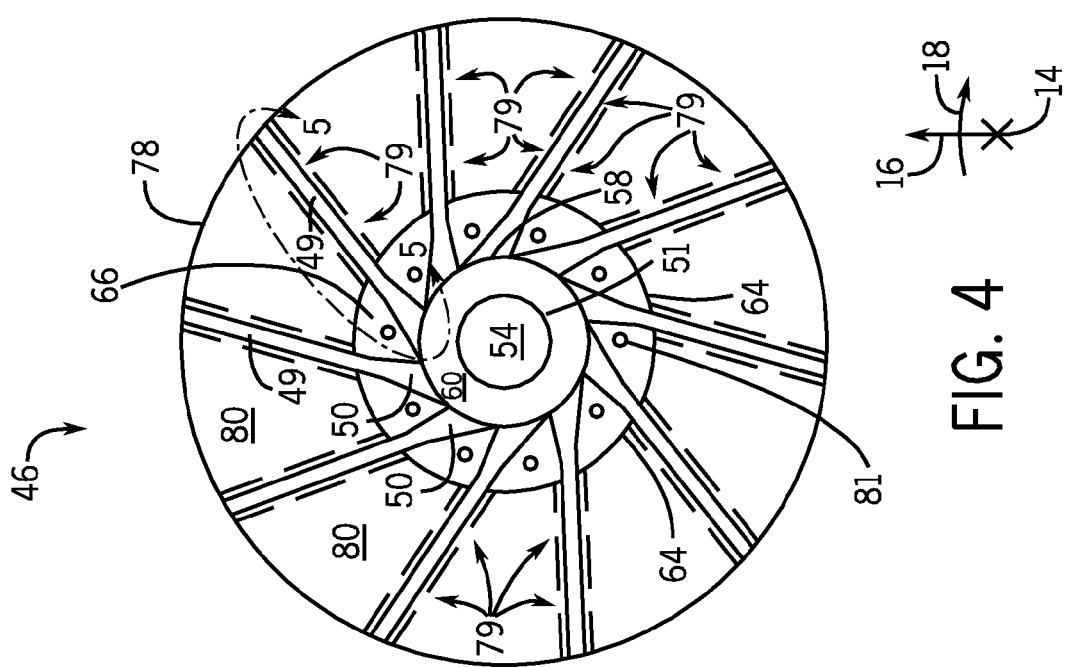
FIG. 4 is a cross-sectional view of an embodiment of the swirl vanes of FIG. 3, taken along line 4-4, illustrating respective air passages with diverging outlets to improve fuel/air mixing.

FIG. 3 is a cross-sectional view of an embodiment of the fuel nozzle 12 equipped with a swirler 46 having swirl vanes 48 with diverging air outlets 50 (more clearly shown in FIG. 4). The diverging outlets 50 may be tapered, conical, and/or gradually increase in width to improve mixing of the air and the fuel in premixing tubes 70. In certain embodiments, it may be desirable to equip the outer fuel nozzles 42 with the swirler 46 having the diverging air outlets 50 and to employ a different design for the central fuel nozzle 44. However, in certain embodiments, the central fuel nozzle 44 may be equipped with the swirler 46 with the diverging air outlets 50. In other words, the swirler 46 may be used within the outer fuel nozzles 42, the central fuel nozzle 44, or any combination thereof.

As illustrated, the fuel nozzle 12 includes an inner wall 51 defining a central passage 54 (e.g., inner cylindrical passage). During operation of the fuel nozzle 12, liquid fuel or purge air for gaseous fuel usage may be routed through the central passage 54 in the axial direction 14, as shown by arrows 56. A hub wall 58 defines a first annular passage 60. During operation of the fuel nozzle 12, the vane curtain air from the swirler 46 flows through the first annular passage 60 along arrows 62 and into one or more premixing tubes 70. Again, the swirler 46 includes the diverged air outlets 50 to reduce the swirl of the vane curtain air, thereby improving the operability of the fuel nozzle 12.

An outer wall 64 surrounds the hub wall 58, defining a second annular passage 66. During operation of the fuel nozzle 12, the fuel 30 is routed through the second annular passage 66 in the axial direction 14, as shown by arrows 68. The fuel 30 enters the premixing tubes 70 in the radial direction 16 through at least one fuel hole 71 (e.g., an opening or aperture) in the premixing tubes 70, as indicated by arrows 72. Within the premixing tubes 70, the fuel 30 mixes with the air 26 to form a combustible mixture and is directed into the combustor 22.

A shroud 78 (e.g., annular shroud wall) is disposed about the outer wall 64, defining a third annular passage 80. A portion of the air 26 enters upstream of swirler 46 in axial direction 14 through the third passage 80, mixes with the fuel injected from at least one fuel hole 79 coupled to fuel plenum 85 (e.g., fuel passage) within swirl vanes 48 and travels in the axial direction 14 toward the outlet 74 of the fuel nozzle 12, as indicated by arrows 82. However, a second portion of the air 26 (e.g., vane curtain air) enters the first annular passage 60 radially 16 through the swirler 46, which includes the one or more swirl vanes 48 circumferentially 18 spaced about an axis of the fuel nozzle 12. That is, the air 26 flows through one or more vane curtain air passages 49 (e.g., radial air passages) within the swirl vanes 48. In certain embodiments, the vane curtain air may flow through one or more inlet flow conditioners (e.g., a perforated annular sheet) to meter and diffuse the air into the fuel nozzle 12. As noted above, the swirl vanes 48 include the diverged air outlets 50, which reduce the circumferential 18 swirl of the vane curtain air as it enters the first annular passage 60. The diverging outlets 50 help to diffuse, reduce the velocity of, and generally straighten the flow of the vane curtain air toward the premixing tubes 70 (e.g., toward inlets of the premixing tubes 70). In other words, the swirl vanes 48 have two purposes: one to generate swirl in the passage 80, and another to deliver the vane curtain air with reduced or no swirl into the first annular passage 60. The reduced swirl of the vane curtain air increases the flame stability within the combustor 22 and reduces the formation of undesirable combustion byproducts.

As shown, the premixing tubes each have an axial air inlet 73 at one end 75 of the tube 70, one or more lateral fuel inlets 71 in a side wall 77 of the tube, and an axial outlet 83 at an opposite end 87 of the tube 70 that discharges a fuel/air mixture from each premixing tube 70. As illustrated, diverging outlet 50 of the swirl vanes 48 substantially reduces the swirl (e.g., circumferential velocity) of the vane curtain air along the first annular passage 60 as it travels in the axial direction 14. Indeed, when the vane curtain air enters the premixing tubes 70, the circumferential velocity is substantially less than the axial velocity of the vane curtain air. In certain embodiments, the swirl velocity may be approximately zero. The reduced swirl velocity may result in a more uniform distribution of air in each premixing tube 70 and among the premixing tubes 70, thereby improving the efficiency and operability of the fuel nozzles 12.

Within the premixing tubes 70, the straightened vane curtain air mixes with the fuel 30, which flows radially into the premixing tubes. As will be appreciated, the reduced swirl velocity of the vane curtain air may also result in a more uniform equivalence ratio (i.e., ratio of the actual fuel/air ratio to the stoichiometric fuel/air ratio) in each premixing tube 70 and between the premixing tubes 70. For example, the equivalence ratios within each premixing tube 70 may be between approximately 0.3 to 0.7, 0.4 to 0.6, or 0.53 to 0.56, and all subranges therebetween. The increased uniformity of equivalence ratios among the premixing tubes 70 improves the mixing of the fuel 30 and the air 26, thereby improving the flame stability within the combustor 22 and reducing the amount of undesirable combustion byproducts. As noted above, the combustion of the fuel 30 and the air 26 is made more efficient by the diverging outlet 50 within of the swirl vanes 48, the geometry of which will be described in greater detail below.

FIG. 4 is a cross-sectional view taken along line 4-4 of FIG. 3 illustrating an embodiment of the swirler 46 having the diverging outlets 50 within each swirl vane 48. As shown, the swirl vanes 48 extend from the shroud 78 to the first annular passage 60. In addition, the swirl vanes 48 include air passages 49 (e.g., vane curtain air passages 49) that extend radially 16 along a length of the swirl vane 48 from the shroud 78 to the hub wall 58. The air passages 49 include the diverged outlets 50 to diffuse the air flow, reduce the circumferential velocity of the air flow, and generally straighten the air flow of the vane curtain air entering the first annular passage 60. The fuel 30 flows through the second annular passage 66 (shown in FIG. 3) into one or more fuel holes 79 coupled to fuel plenum 85 (shown in FIG. 3) and through the cylindrical fuel passage 81 into the fuel holes 71 on the side wall of the premixing tubes 70. Within the premixing tubes 70, the uniformity of the fuel 30 and the air 26 is improved, such that the equivalence ratio within each premixing tube 70 is approximately equal, as discussed previously.

Figure 5:
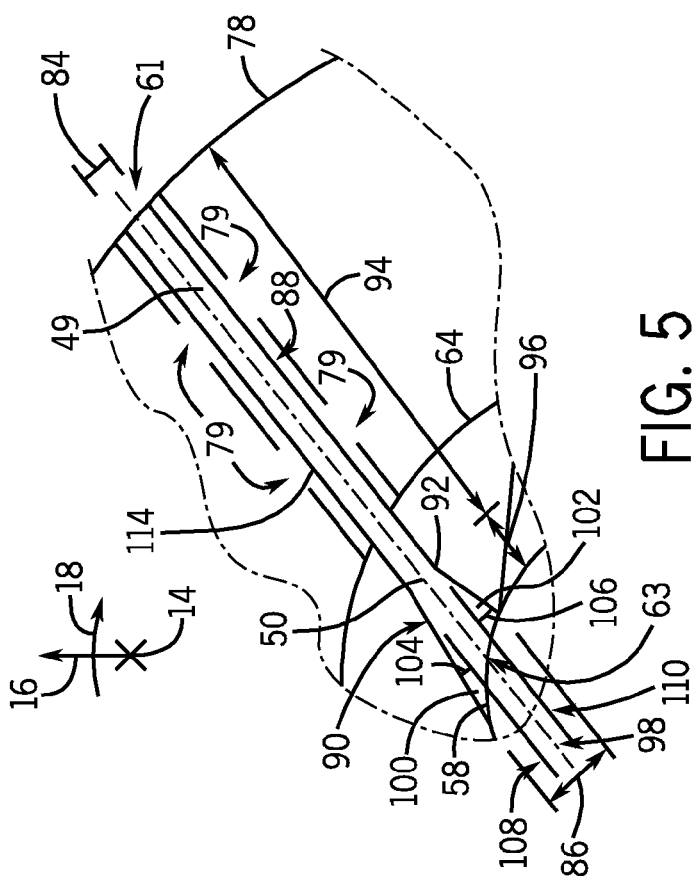
FIG. 5 is a cross-sectional view of an embodiment of one of the swirl vanes of FIG. 4, taken within line 5-5, illustrating a diverging outlet.

FIG. 5 illustrates an embodiment of one of the swirl vanes 48 having the diverging outlet 50 taken within the line 5-5 of FIG. 4. As shown, the swirl vane 48 has an inlet 61 (e.g., the vane curtain air inlet 68) and an outlet 63 into the first annular passage 60. The swirl vane 48 has an inlet width 84 adjacent the shroud 78 and an outlet width 86 adjacent the hub wall 58. Notably, the outlet width 86 is larger than the inlet width 84, defining the diverging outlet 50. The transition from the inlet width 84 to the outlet width 86 reduces the swirl of (e.g., straightens) the air 26 within the first annular passage 60 and diffuses the air flow, thereby improving the uniformity of the air 26 and the fuel 30 within the combustor 22.

As illustrated, the vane curtain air passage 49 within the swirl vane 48 has a constant width portion 88 and a varying width portion 90, and a transition point 92 disposed therebetween. The constant width portion 88 extends along a length 94 of the swirl vane 48 radially 16 from the inlet 61 to the transition point 92. Within the constant width portion 88, the width of the swirl vane 48 (i.e. inlet width 84) is approximately constant. In addition, the varying width portion 90 extends along a length 95 of the air passage of the swirl vane 48. The width (e.g., 84 and 86) of the vane curtain air passage 49 within the swirl vane 48 gradually changes (e.g., diverges or enlarges along the axial 14, radial 16, and/or circumferential 18 directions) from the transition point 92 to the outlet 63 along the length 96 of the varying width portion 90. In certain embodiments, the width (e.g., 84 and 86) of the air passage of the swirl vane 48 may vary along an entire length 95 of the swirl vane 48. That is, the swirl vane 48 may not include the constant width portion 88 and the transition point 92.

The swirl vane 48 also includes a centerline 98 extending radially 16 from the shroud 78 to the hub wall 58. The centerline 98 is offset relative to the longitudinal axis 17 (shown in FIG. 3) of the fuel nozzle 12. The centerline 98 divides the swirl vane 48 into two sections 100 and 102. As will be appreciated, the shape of the swirl vane 48 may vary. Thus, in certain configurations, the centerline 98 may define an axis 112 of symmetry of the swirl vane 48, and the sections 100 and 102 may be identical. As shown, the sections 100 and 102 form corresponding angles 104 and 106 with the reference lines 108 and 110. The angles 104 and 106 are formed relative to the internal surface 114 of the diverging outlets 50. The references lines 108 and 110 are parallel to the centerline 98 and are crosswise to the longitudinal axis 17 (shown in FIG. 3) of the fuel nozzle 12. In other words, the angles 104 and 106 are formed relative to the centerline 98. The angles 104 and 106 are generally different and are designed to impart a minimum circumferential velocity to the air 26 as the air passages through the diverging outlets 50 into the first annular passage 60. The angles 104 and 106 may vary according to the shape of the swirl vane 48 and/or the diverging outlet 50, and thus may be implementation-specific. For example, each of the angles 104 and 106 may be between approximately 1 to 50, 5 to 25, or 10 to 15 degrees, and all subranges therebetween. Further, the angles 104 and 106 may be different from each other.

Technical effects of the disclosed embodiments include systems and methods for improving the mixing of the air 26 and the fuel 30 within the fuel nozzles 12 of a gas turbine system. In particular, the fuel nozzle 12 is equipped with the swirler 46 having the diverging outlets 50 in the swirl vanes 48. In other words, the width of the air passages 49 increases toward the hub wall 58. The diverging outlets 50 reduce the circumferential velocity of the air 26, thereby increasing the uniformity of the air 26 and the fuel 30 within the fuel nozzle 12. The increased mixing of the air 26 and the fuel 30 increases the flame stability within the combustor 22 and reduces the amount of undesirable combustion byproducts.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a fuel nozzle, comprising:
      an inner wall defining a central passage extending in an axial direction of the fuel nozzle;
      a hub wall surrounding the inner wall and defining a first annular passage;

an outer wall surrounding the hub wall and defining a second annular passage;

a shroud surrounding the outer wall and defining a third annular passage; and a swirler configured to receive air and to direct the air into the first annular passage, wherein the swirler comprises at least one swirl vane extending from the shroud to the hub wall, wherein the at least one swirl vane comprises an air passage extending between the shroud and the hub wall, and the air passage is coupled to the first annular passage and has a first width adjacent the shroud and a second width adjacent the hub wall, and the second width is larger than the first width defining a diverging outlet into the first annular passage.

2. The system of claim 1, wherein the swirler comprises a plurality of swirl vanes, and wherein each swirl vane of the plurality of swirl vanes comprises a respective air passage having a respective diverging outlet.

3. The system of claim 1, wherein the air passage comprises a first portion between the shroud and a transition point between the hub wall and the outer wall and a second portion between the transition point and the hub wall, and wherein a width of the air passage gradually expands along the second portion of the swirl vane in a radial direction toward the hub wall.

4. The system of claim 3, wherein the width of the air passage is approximately constant along the first portion of the swirl vane.

5. The system of claim 1, comprising a combustor having a plurality of outer fuel nozzles disposed about a central fuel nozzle, wherein the fuel nozzle comprises one of the plurality of outer fuel nozzles.

6. The system of claim 1, wherein the swirler is configured to receive the air in a radial direction crosswise to the first annular passage.

7. The system of claim 1, comprising a combustor having a plurality of outer fuel nozzles disposed about a central fuel nozzle, wherein the fuel nozzle comprises the central fuel nozzle.

8. The system of claim 1, wherein the at least one swirl vane comprises a fuel passage extending between the shroud and the hub wall, the air passage extending between the shroud and the outer wall, and wherein the fuel passage is configured to route the fuel through one or more fuel holes in the at least one swirl van into the third annular passage, and wherein the air passage is configured to route the air through the at least swirl vane axially into the third annular passage to mix with the fuel routed through the one or more fuel holes.

9. The system of claim 1, comprising a plurality of premixing tubes extending in the axial direction and coupled to the first annular passage, wherein the plurality of premixing tubes have one or more fuel holes configured to receive the fuel through the second annular passage, wherein the plurality of premixing tubes is configured to receive a generally uniform distribution of the air, to mix fuel and the air, and to direct a mixture of the fuel and the air to an outlet of the fuel nozzle.

10. The system of claim 9, wherein the first annular passage is configured to receive a flow of the air having a circumferential velocity, and wherein the diverging outlet of the air passage is configured to reduce the circumferential velocity upstream of the plurality of premixing tubes.

11. The system of claim 9, wherein the second annular passage is configured to receive a flow of the fuel, and wherein the fuel is routed through one or more fuel holes in the side wall of each premixing tube.

12. A method of using the system of claim 1, the method comprising:
   directing a first portion of air through the third annular passage; and
   directing a second portion of air through the air passage of the swirler into the first annular passage.

13. The method of claim 12, comprising directing a fuel through a fuel plenum of the swirler into a third annular passage between the outer wall and the hub wall.

14. The method of claim 13, comprising:
   directing the fuel into one or more premixing tubes;
   mixing the fuel with the second portion of the air; and
   directing a mixture of the fuel and the second portion of the air into a combustion region of a combustor.

15. The method of claim 14, comprising directing the fuel though the third annular passage into the combustion region of the combustor.

* * * * *